United States Patent
Chi et al.

(10) Patent No.: US 11,557,090 B2
(45) Date of Patent: Jan. 17, 2023

(54) TESSELLATION DATA PROCESSING METHOD, SYSTEM, MEDIUM AND VECTOR GRAPHICS PROCESSING DEVICE

(71) Applicants: VeriSilicon Microelectronics (Shanghai) Co., Ltd., Shanghai (CN); VeriSilicon Holdings Co., Ltd., Cayman Islands (KY); VeriSilicon Microelectronics (Nanjing) Co., Ltd., Nanjing (CN)

(72) Inventors: Cheng Chi, Shanghai (CN); Jiangbo Li, Shanghai (CN); Mike M Cai, Newark, CA (US)

(73) Assignees: VeriSilicon Microelectronics (Shanghai) Co., Ltd., Shanghai (CN); VeriSilicon Holdings Co., Ltd., Cayman Islands (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 16 days.

(21) Appl. No.: 17/378,803

(22) Filed: Jul. 19, 2021

(65) Prior Publication Data
US 2022/0028165 A1 Jan. 27, 2022

(30) Foreign Application Priority Data
Jul. 17, 2020 (CN) .......................... 202010693897.6

(51) Int. Cl.
  *G06T 17/20* (2006.01)
  *G06T 1/20* (2006.01)
  *G06T 1/60* (2006.01)

(52) U.S. Cl.
  CPC .............. *G06T 17/20* (2013.01); *G06T 1/20* (2013.01); *G06T 1/60* (2013.01)

(58) Field of Classification Search
  CPC .. G06T 17/20; G06T 1/20; G06T 1/60; G06T 11/40; G06F 12/0811; G06F 16/2237
  See application file for complete search history.

(56) References Cited

U.S. PATENT DOCUMENTS

2015/0062142 A1* 3/2015 Goel ..................... G06T 11/203
                                                            345/582

FOREIGN PATENT DOCUMENTS

| CN | 102682419 B | * | 4/2015 | ............... G06T 1/60 |
| JP | 3796478 B2 | * | 7/2006 | ............. G06T 11/40 |
| KR | 20100052850 A | * | 5/2010 | ............... G06T 9/20 |

* cited by examiner

*Primary Examiner* — Jennifer Mehmood
*Assistant Examiner* — Donna J. Ricks

(57) ABSTRACT

The present disclosure provides a tessellation data processing method, system, medium and vector graphics processing device. The method includes: constructing a data structure including a content table and information tables in memory; when a vector line generated by tessellation intersects an horizontal/vertical line to obtain a new intersection, reading an address and number of Xnodes or Ynodes of an information table in the content table corresponding to a row/column corresponding to the Y/X coordinate of the intersection; according to the address of the information table and the number of X/Ynodes of the information table, reading corresponding X/Ynodes from the memory; comparing information of the intersection with the X/Ynodes, and updating the X/Ynodes in the information table, or adding an X/Ynode to the information table at a position corresponding to the Y/X coordinates. The tessellation data processing method, system, medium and vector graphics processing device of the present disclosure only require recording fill information of effective intersections generated by tessellation, and do not require recording fill information of all pixels, thereby reducing memory footprint and increasing vector graphic rendering performance.

10 Claims, 3 Drawing Sheets

```
┌─────────────────────────────────────────────────────────────┐
│ a data structure is constructed in a memory; the data       │
│ structure comprises an Xnode content table and a plurality  │
│ of Xnode information tables or the data structure comprises │
│ a Ynode content table and a plurality of Ynode              │
│ information tables, wherein each row of the Xnode content   │
│ table stores an address in the memory and a number of       │
│ Xnodes of an Xnode information table corresponding to a     │
│ horizontal line, and each Xnode information table stores    │  S1
│ Xnodes of an information table corresponding to a row of    │
│ the Xnode content table; each row of the Ynode content      │
│ table stores an address in the memory and a number of       │
│ Ynodes of an information table corresponding to a vertical  │
│ line, and each Ynode information table stores Ynodes of an  │
│ information table corresponding to a row of the Ynode       │
│ content table                                               │
└─────────────────────────────────────────────────────────────┘
                              ↓
┌─────────────────────────────────────────────────────────────┐
│ when the data structure comprises the Xnode content table   │
│ and the plurality of Xnode information tables, and a vector │
│ line generated by tessellation intersects a horizontal line │
│ to obtain a first intersection, the Xnode processing        │  S2
│ module reads from the Xnode content table an address and    │
│ number of Xnodes of a first Xnode information table,        │
│ wherein the first Xnode information table corresponds to a  │
│ first row of the Xnode content table corresponding to the   │
│ Y coordinate of the first intersection, and according to    │
│ the address and number of Xnodes of the first Xnode         │
│ information table, the Xnode processing module locates the  │
│ Xnodes of the first Xnode information table in the memory   │
│ and reads the Xnodes of the first Xnode information table   │
│ from the memory, and the Xnode processing module compares   │
│ information of the first intersection with the Xnodes of    │
│ the first Xnode information table, and updates the Xnodes   │
│ on the first Xnode information table or adds an Xnode to    │
│ the first Xnode information table                           │
└─────────────────────────────────────────────────────────────┘
                              ↓
┌─────────────────────────────────────────────────────────────┐
│    When the data structure comprises the Ynode content      │
│    table and the plurality of Ynode information tables,     │  S3
│ and a vector line generated by tessellation intersects a    │
│ vertical line to obtain an second intersection, the Y       │
│ note processing module reads from the Ynode content table   │
│ an address and number of Ynodes of a first Ynode            │
│ information table, wherein the first Ynode information      │
│ table corresponds to a first row of the Y content table     │
│ corresponding to the X coordinate of the second             │
│ intersection, according to the address and number of        │
│ Ynodes of the first Ynode information table, the Y note     │
│ processing module locates the Ynodes of the first Ynode     │
│ information table in the memory and reads the Ynodes of     │
│ the first Ynode information table from the memory, and      │
│ the Ynode processing module compares information of the     │
│ second intersection with the Ynodes of the first Ynode      │
│ information table, and updates the Ynodes on the first Y    │
│ information table or adds a Ynode to the first Y            │
│ information table.                                          │
└─────────────────────────────────────────────────────────────┘
```

Fig. 1

Content Table

| | |
|---|---|
| $Y_0$ | $Count_0$ + $Addr_0$ |
| $Y_1$ | $Count_1$ + $Addr_1$ |
| $Y_2$ | $Count_2$ + $Addr_2$ |
| $Y_3$ | $Count_3$ + $Addr_3$ |
| ...... | |
| $Y_{n-1}$ | $Count_{n-1}$ + $Addr_{n-1}$ |
| $Y_n$ | $Count_n$ + $Addr_n$ |

Information Table

| | |
|---|---|
| $X_0$ | Coord+Direction+Count+$SubLoc_0$+$SubLoc_1$+$SubLoc_2$+$SubLoc_3$ |
| $X_1$ | Coord+Direction+Count+$SubLoc_0$+$SubLoc_1$+$SubLoc_2$+$SubLoc_3$ |
| $X_2$ | Coord+Direction+Count+$SubLoc_0$+$SubLoc_1$+$SubLoc_2$+$SubLoc_3$ |
| ...... | |
| $X_m$ | Coord+Direction+Count+$SubLoc_0$+$SubLoc_1$+$SubLoc_2$+$SubLoc_3$ |

Fig. 2

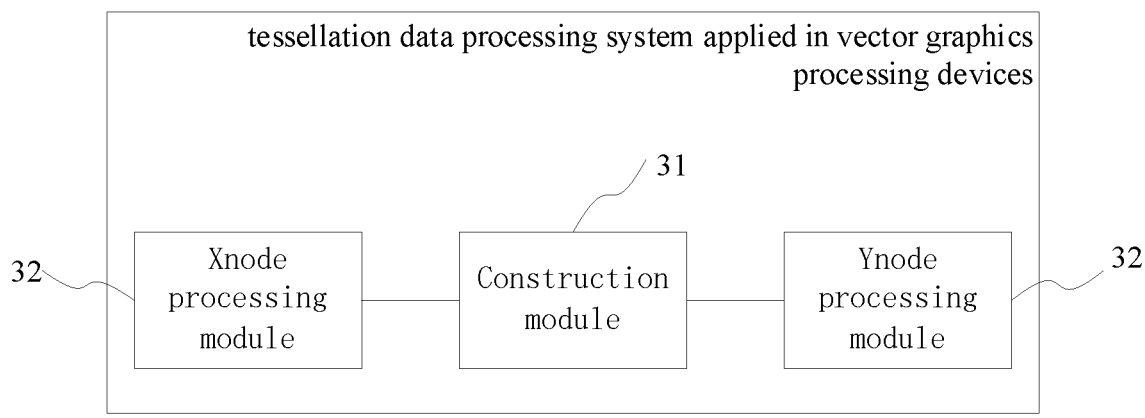

Fig. 3

TESSELLATION DATA PROCESSING METHOD, SYSTEM, MEDIUM AND VECTOR GRAPHICS PROCESSING DEVICE

CROSS REFERENCE TO RELATED APPLICATION

The present application claims the benefit of priority to Chinese Patent Application No. CN 2020106938976, entitled "TESSELLATION DATA PROCESSING METHOD, SYSTEM, MEDIUM AND VECTOR GRAPHICS PROCESSING DEVICE", filed with CNIPA on Jul. 17, 2020, the disclosure of which is incorporated herein by reference in its entirety.

FIELD OF TECHNOLOGY

The present disclosure generally relates to a data processing method, in particular to a tessellation data processing method, system, medium and vector graphics processing device.

BACKGROUND

In the field of vector graphics, lines generated by Tessellation intersect a certain line parallel to the y-axis, thereby creating intersections, and data regarding the intersections need to be stored in memory. After a current vector graph is processed by tessellation, the intersection data stored in the memory is retrieved, then a coverage value of each pixel in the vector graph is calculated according to Fill Information and Position Information of the intersections, and then the entire vector graph is redrawn according to filling rules.

In the prior art, the memory used in Tessellation stores Fill Information and statistics of all the pixels of the entire vector graph, and therefore Tessellation usually generates a large amount of memory footprints.

In addition, after the entire vector graph is processed, the data structure in the existing technology requires retrieving all the data in the memory according to their corresponding positions on the vector graph, from top to bottom and from left to right, in order to find all the intersections and make filling decisions. The above memory data retrieving method has the following shortcomings:

(1) the bandwidth of the system is relatively large;
(2) it takes a long time to find the intersections, which means an increased bubble time for vector graphics filling, which seriously affects rendering capacity.

SUMMARY

The present disclosure provides a tessellation data processing method, system, medium, and vector graphics processing device. The tessellation data processing method, system, medium and vector graphics processing device of the present disclosure require recording fill information of only effective intersections generated by tessellation, and do not require recording fill information of all pixels, thereby decreasing demand for memory sources and increasing vector graphic rendering performance.

The present disclosure provides: a tessellation data processing method applied in vector graphics processing devices, including constructing a data structure in memory, with the data structure including an Xnode content table and several of Xnode information tables or the data structure including a Ynode content table and several Ynode information tables; each row of the Xnode content table stores an address in the memory and a number of Xnodes of an Xnode information table corresponding to a horizontal line, and each Xnode information table stores Xnodes of an information table corresponding to a horizontal line of the Xnode content table; each row of the Ynode content table stores an address in the memory and a number of Ynodes of an information table corresponding to a vertical line, and each Ynode information table stores Ynodes of an information table corresponding to a row of the Ynode content table. The method also includes: when the data structure includes the Xnode content table and the several Xnode information tables, and a vector line generated by tessellation intersects a horizontal line to obtain a first intersection, from the Xnode content table, reading an address and number of Xnodes of a first Xnode information table, the first Xnode information table corresponding to a first row of the Xnode content table corresponding to the Y coordinate of the first intersection; according to the address and number of Xnodes of the first Xnode information table, locating and reading Xnodes of the first Xnode information table from the memory; comparing information of the first intersection with the Xnodes of the first Xnode information table, and updating or adding Xnodes on the first Xnode information table.

The method also includes: when the data structure includes the Ynode content table and the several Ynode information tables, and a vector line generated by tessellation intersects a vertical line to obtain an second intersection, from the Ynode content table, reading an address and number of Ynodes of a first Ynode information table, the first Ynode information table corresponding to a first row of the Y content table corresponding to the X coordinate of the second intersection; according to the address and number of Ynodes of the first Ynode information table, locating and reading Ynodes of the first Ynode information table from the memory; and comparing information of the second intersection with the Ynodes off the first Ynode information table, and updating or adding Ynodes on the first Y information table.

In one embodiment of the present disclosure, the Xnodes of the first Xnode information table comprises X coordinates, Fill Information, numbers of sub-locations, and sub-location information of intersections, wherein the Ynodes of the first Xnode information comprises Y coordinates, Fill Information, numbers of sub-locations, and sub-location information of intersections, wherein the information of the first intersection includes an X coordinate, the Y coordinate, sub-location information, and Fill Information of the first intersection, wherein the information of the second intersections includes the X coordinate, a Y coordinate, sub-location information, and Fill Information of the second intersection.

In an embodiment of the present disclosure, the number of sub-locations can be customized and is not a fixed value, as long as information of all sub-locations of each intersection can be recorded.

In an embodiment of the present disclosure, when the data structure includes the Xnode content table and the several Xnode information tables, and the X coordinate of the first intersection is not equal to any X coordinate included in the Xnodes of the first Xnode information table, an Xnode is added to a corresponding position in the first Xnode information table, and the number of Xnodes of the first Xnode information table as reflected in the Xnode content table is updated at the same time;

when the data structure comprises the Ynode content table and the plurality of Ynode information tables, and the Y coordinate of the second intersection is not equal to any Y coordinate included in the Ynodes of the first Ynode information table, a Ynode is added to a corresponding position in the first Ynode information table, and the number of Ynodes of the first Ynode information table as reflected in the Ynode content table is updated at the same time.

In an embodiment of the present disclosure, when the data structure includes the Xnode content table and the several Xnode information tables, and the X coordinate of the first intersection is the same as one of the X coordinates included in the Xnodes of the first Xnode information table, an Xnode corresponding to the X coordinate is updated; when the data structure includes the Ynode content table and the plurality of Ynode information tables, and the Y coordinate of the second intersection is the same as one of the Y coordinates included in the Ynodes of the first Ynode information table, a Ynode corresponding to the Y coordinate is updated.

In an embodiment of the present disclosure, Xnodes in the Xnode information tables are sorted according to corresponding X coordinates of the Xnodes, and Ynodes in the Ynode information tables are sorted according to Y coordinates of the Ynodes.

In an embodiment of the present disclosure, the bit width of each Xnode in the data structure is adjustable and is of a fixed value when the maximum number of sub-locations of Xnodes is determined; the bit width of each Ynode in the data structure is adjustable and is of a fixed value when the maximum number of sub-locations of Ynodes is determined.

The present disclosure also provides a tessellation data processing system applied in vector graphics processing devices, including a construction module, an Xnode processing module and a Ynode processing module.

the construction module constructs a data structure in memory, the data structure comprises an Xnode content table and a plurality of Xnode information tables or the data structure comprises a Ynode content table and a plurality of Ynode information tables, wherein each row of the Xnode content table stores an address in the memory and a number of Xnodes of an Xnode information table corresponding to a horizontal line, and each Xnode information table stores Xnode information contained in an information table corresponding to row of the Xnode content table; wherein each row of the Ynode content table stores an address in the memory and a number of Ynodes of an information table corresponding to a vertical line, and each Ynode information table stores Ynode information contained in an information table corresponding to a row of the Ynode content table;

when the data structure comprises the Xnode content table and the plurality of Xnode information tables, and a vector line generated by tessellation intersects a horizontal line to obtain a first intersection, the Xnode processing module reads from the Xnode content table an address and number of Xnodes of a first Xnode information table, wherein the first Xnode information table corresponds to a first row of the Xnode content table corresponding to the Y coordinate of the first intersection, and according to the address and number of Xnodes of the first Xnode information table, the Xnode processing module locates the Xnodes of the first Xnode information table in the memory and reads the Xnodes of the first Xnode information table from the memory, and the Xnode processing module compares information of the first intersection with the Xnodes of the first Xnode information table, and updates Xnodes on the first Xnode information table or adds an Xnode to the first Xnode information table;

when the data structure comprises the Ynode content table and the plurality of Ynode information tables, and a vector line generated by tessellation intersects a vertical line to obtain an second intersection, the Y note processing module reads from the Ynode content table an address and number of Ynodes of a first Ynode information table, wherein the first Ynode information table corresponds to a first row of the Y content table corresponding to the X coordinate of the second intersection, according to the address and number of Ynodes of the first Ynode information table, the Y note processing module locates the Ynodes of the first Ynode information table in the memory and reads the Ynodes of the first Ynode information table from the memory, and the Ynode processing module compares information of the second intersection with the Ynodes of the first Ynode information table, and updates the Ynodes on the first Y information table or adds a Ynode to the first Y information table.

The present disclosure also provides a storage medium on which a computer program is stored; when the computer program is executed by a processor, the tessellation data processing method applied in vector graphics processing devices mentioned above is realized.

Finally, the present disclosure provides a vector graphics processing device, including: a processor and memory;

The memory is used for storing computer programs;

The processor is used to execute the computer programs stored in the memory to cause the vector graphics processing device to perform the tessellation data processing method applied in vector graphics processing devices mentioned above.

As described above, the tessellation data processing method, system, medium and vector graphics processing device of the present disclosure vector graphics processing device have the following beneficial effects:

(1) Through an sorting algorithm based on X or Y coordinates, Fill Information of only effective intersections generated by tessellation, and there is no need to save Fill Information of all pixels of the whole vector graph, which effectively reduces the memory footprint;

(2) Vector graphics can be filled directly according to the saved information of intersections in order to avoid spending extra time on searching for intersections, effectively reducing the system bandwidth and improving vector graphics rendering performance.

BRIEF DESCRIPTION OF THE DRAWINGS

FIG. 1 shows a flowchart showing various steps of a tessellation data processing method applied in vector graphics processing devices according to an embodiment of present disclosure;

FIG. 2 shows a schematic diagram of a data structure used in tessellation in a vector graphics processing device according to an embodiment of present disclosure.

FIG. 3 shows a schematic diagram of a tessellation data processing system applied in vector graphics processing devices according to an embodiment of present disclosure.

Figure 4:
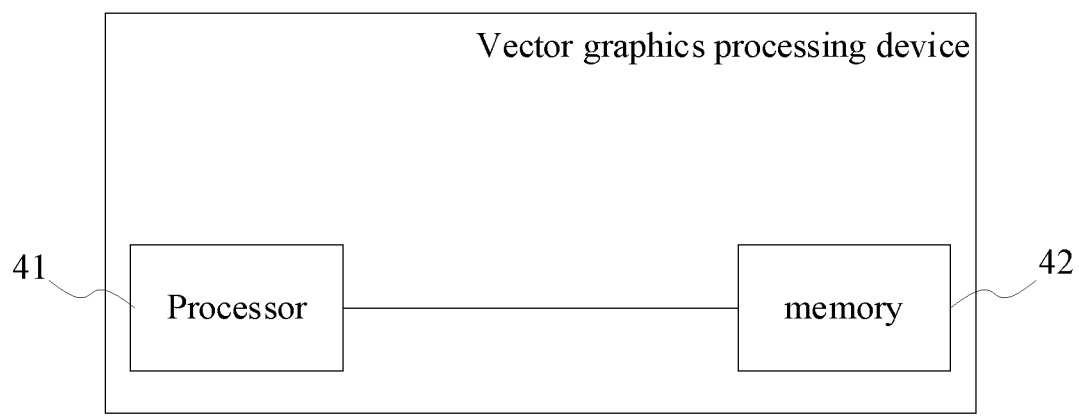
FIG. 4 shows a schematic diagram of a vector graphics processing device according to an embodiment of present disclosure.

REFERENCE NUMERALS 31 construction module
32 Xnode processing module
33 Ynode processing module
41 processor
42 memory.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The tessellation data processing method, system, medium and vector graphics processing device of the present disclosure only require recording fill information of effective intersections generated by tessellation, and do not require recording fill information of all pixels, thereby decreasing memory footprint and increasing vector graphic rendering performance. At the same time, because the X coordinates or Y coordinates of the intersections are sorted and stored in the Cartesian coordinate system, there is no need to search for the intersections, which effectively improves vector graphics rendering performance.

As shown in FIG. 1, the tessellation data processing method applied in vector graphics processing devices includes the following steps:

S1: a data structure is constructed in memory; the data structure comprises an Xnode content table and a plurality of Xnode information tables or the data structure comprises a Ynode content table and a plurality of Ynode information tables, wherein each row of the Xnode content table stores an address in the memory and a number of Xnodes of an Xnode information table corresponding to a horizontal line, and each Xnode information table stores Xnodes of an information table corresponding to a row of the Xnode content table; each row of the Ynode content table stores an address in the memory and a number of Ynodes of an information table corresponding to a vertical line, and each Ynode information table stores Ynodes of an information table corresponding to a row of the Ynode content table.

According to one embodiment of the present disclosure, the data structure comprises an Xnode content table and a plurality of Xnode information tables; each row of the Xnode content table stores an address in the memory and a number of Xnodes of an Xnode information table corresponding to a horizontal line, and each Xnode information table stores Xnodes of an information table corresponding to a row of the Xnode content table. "Xnodes" refers to units of a table which store information regarding intersections that have different X coordinates and the same Y coordinate. The intersections are resulted from vector lines intersecting X lines. Here, "X lines" refers to lines that are parallel to the X-axis.

In another embodiment of present disclosure, the data structure comprises a Ynode content table and a plurality of Ynode information tables; each row of the Ynode content table stores an address in the memory and a number of Ynodes of an information table corresponding to a vertical line, and each Ynode information table stores Ynodes of an information table corresponding to a row of the Ynode content table. "Ynodes" refers to units of a table which store information regarding intersections that have different Y coordinates and the same X coordinate. The intersections are resulted from vector lines intersecting Y lines. Here, "Y lines" refers to lines that are parallel to the Y-axis.

Specifically, a novel data structure is built in the memory of a vector graphics processing device to store data generated by tessellation. As shown in FIG. 2, the data structure adopts a two-level structure, the first level being the content tables, and the second level being the information tables. FIG. 2 takes for example the case when the data structure includes the Xnode content table and the Xnode information tables. The Xnode content table comprises rows; each row of the Xnode content table stores an address in the memory (Addr) and a number of Xnodes (Count) of an Xnode information table corresponding to the row. In some embodiments, the X node content table comprises columns. The following descriptions take for example the case when the X content table comprises rows. In other words, each row corresponding to a Y coordinate corresponds to an Xnode information table. Based on the Y coordinate, the Xnode content table stores the address in the memory of the Xnode information table and the number of Xnodes of the Xnode information table corresponding to the row. For example, when the Y coordinate is Y0, the address of a corresponding Xnode information table is Addr0, and the number of Xnodes of the Xnode information table is Count0; when the Y coordinate is Y1, the address of a corresponding Xnode information table is Addr1, and the number of Xnodes of the Xnode information table is Count1; similarly, when the Y coordinate is Yn, the corresponding address is Addrn, and the number of Xnodes is Countn.

Each Xnode information table corresponds to a row of the Xnode content table which further corresponds to a Y coordinate. And Each X node information table comprises several elements, i.e. Xnodes, each of which contains information regarding an intersection; similarly, each Ynode information table corresponds to a row of the Ynode content table which further corresponds to an X coordinate. And Each Y node information table comprises several elements, i.e. Ynodes, each of which contains information regarding an intersection; Each Xnode of an Xnode information table is stored in a position corresponding to a horizontal line. In one embodiment, an Xnode includes the X coordinate (Coord), Fill Information, a number of sub-location (Count) and sub-location Information (SubLoc) of an intersection. Accordingly, a Ynode (not shown) includes the Y coordinate, Fill Information, a number of sub-locations and sub-location information of an intersection. In the embodiment shown in FIG. 2, there are four sub-locations in each X node, and corresponding sub-location information includes SubLoc0, SubLoc1, SubLoc2, and SubLoc4. In an embodiment, the bit width of an Xnode or a Ynode in the data structure is a fixed value. Therefore, for example, when reading data in the data structure, a row of the Xnode content table/Ynode content table is first read, then according to the number of Xnodes or Ynodes retrieved from this row and the bit width of an Xnode or a Ynode, the data length of a Xnode information table or Ynode information table corresponding to this line can be determined. Then through the address of the Xnode/the Ynode stored in this row of the content table, all the valid data of the Xnode information table or the Ynode information table corresponding to this row are directly retrieved from the memory. In an embodiment of the present disclosure, the number of sub-locations of each Xnode or Y node can be customized and is not a fixed value as long as information of all the sub-locations of each Xnode or Ynode can be recorded. In another example of a present disclosure, when the maximum number of the sub-locations is not predetermined, the content tables will also indicate the data length of each information table.

In order to improve the image quality, vector graphics processing applications usually adopt anti-aliasing algorithm to further divide each area covered by intersections into 4, 8, 16, or more sub-locations. Therefore, in order to fix the bit width of an Xnode or a Ynode, the number of sub-locations stored in an Xnode or a Ynode can be set according to the actual requirements and the quality of the anti-aliasing algorithm, such as 4, 6, 8, etc.

In the field of vector graphics, intersections may be crossed multiple times by a vector line as the drawing progresses, each time in a different direction. Every time an intersection is crossed by a vector line, the sub-location where the vector line passes and corresponding Fill Information should be recorded. Since an intersection may be crossed multiple times, information of two sub-locations may be the same. The fill information of all sub-locations recorded in a certain Xnode or Ynode is the same, and each Xnode or Ynode includes a corresponding Fill Information field; at the same time, sub-locations which vector lines pass through in a same direction are recorded together in one Xnode or Ynode, and this direction is represented by the Fill Information of the Xnode or Ynode. Therefore, if an intersection is crossed by vector lines in different directions or the number of sub-locations exceeds a preset value, information regarding the intersection will be stored in two or more Xnodes or Ynodes, and the X coordinates or Y coordinates of these two or more Xnodes or Ynodes are the same.

In an embodiment of the present disclosure, Xnodes in the Xnode information tables are sorted according to corresponding X coordinates of the Xnodes. Ynodes in the Ynode information tables are sorted according to Y coordinates of the Ynodes. When the tessellation is completed, the vector graphics can be rendered by retrieving the Xnodes/Ynodes to perform vector graphics rendering, and intersection information saved orderly in the Xnode information tables or Ynode information tables can directly provide a basis for rendering vector graphics, so that there is no need to search for the intersections and the performance of vector graphics rendering is improved.

Since the Xnode information table and Ynode information tables only store the information of intersections, and there is no need to store the direction information of all the pixels of the entire vector graph, memory footprint is significantly reduced.

S2: when the data structure comprises the Xnode content table and the plurality of Xnode information tables, and a vector line generated by tessellation intersects a horizontal line to obtain a first intersection, the Xnode processing module reads from the Xnode content table an address and number of Xnodes of a first Xnode information table, wherein the first Xnode information table corresponds to a first row of the Xnode content table corresponding to the Y coordinate of the first intersection, and according to the address and number of Xnodes of the first Xnode information table, the Xnode processing module locates the Xnodes of the first Xnode information table in the memory and reads the Xnodes of the first Xnode information table from the memory, and the Xnode processing module compares information of the first intersection with the Xnodes of the first Xnode information table, and updates the Xnodes on the first Xnode information table or adds an Xnode to the first Xnode information table;

Specifically, when the data structure includes the Xnode content table and the Xnode information tables, and when a new intersection is acquired during the tessellation, the data structure needs to be updated according to the information of the intersection. Firstly, the address and the number of Xnodes of an Xnode information table corresponding to a row of the Xnode content table in the data structure are obtained according to the Y coordinate of the intersection.

Specifically, all Xnodes in the first Xnode information table are read from the Xnode information table according to the address and the number of Xnodes of the first Xnode information table. The Xnodes can be read according to the bit width of an Xnode, or according to a preset cut-off mark of Xnodes. Any method that can accurately read the Xnodes is covered by the scope of present disclosure. In an embodiment of the present disclosure, the bit width of each Xnode in the data structure is adjustable and is of a fixed value when the maximum number of sub-locations of Xnodes is determined.

In one embodiment, the information of the first intersection includes an X coordinate, the Y coordinate, sub-location information, and Fill Information of the first intersection. The information of the first intersection is compared with the Xnodes of the first Xnode information table, and accordingly Xnodes on the first Xnode information table are updated or an Xnode is added to the first Xnode information table. When the X coordinate of the first intersection is not the same as any X coordinate of the Xnodes, that means the first intersection is newly generated; then, according to the X coordinate of the intersection and the order the Xnodes are stored in the first Xnode information table, an Xnode is added to a corresponding position in the first Xnode information table, which stores the information of the first intersection; at the same time, the number of Xnodes of the first Xnode information table as reflected in the Xnode content table is also updated, that is, the number is added by 1. When the X coordinate of the first intersection is the same as one of the X coordinates in the Xnodes, it indicates that the position in the first intersection has been crossed by a vector line before, and then an Xnode corresponding to the X coordinate is updated according to the information of the first intersection.

S3: When the data structure comprises the Ynode content table and the plurality of Ynode information tables, and a vector line generated by tessellation intersects a vertical line to obtain an second intersection, the Y note processing module reads from the Ynode content table an address and number of Ynodes of a first Ynode information table, wherein the first Ynode information table corresponds to a first row of the Y content table corresponding to the X coordinate of the second intersection, according to the address and number of Ynodes of the first Ynode information table, the Y note processing module locates the Ynodes of the first Ynode information table in the memory and reads the Ynodes of the first Ynode information table from the memory, and the Ynode processing module compares information of the second intersection with the Ynodes of the first Ynode information table, and updates the Ynodes on the first Y information table or adds a Ynode to the first Y information table.

Specifically, when the data structure includes the Ynode content table and the Ynode information tables, and when a second intersection is acquired during the tessellation, the data structure needs to be updated according to the information of the second intersection. Firstly, the address and the number of Ynodes of a first Ynode information table corresponding to a row of the Ynode content table in the data structure are obtained according to the X coordinate of the second intersection.

Specifically, all Ynodes in the first Ynode information table are read from the first Xnode information table according to the address and the number of Ynodes of the Ynode information table. The Ynodes can be read according to the bit width of an Ynode, or according to a preset cut-off mark of Ynodes. Any method that can accurately read the Ynodes is covered by the scope of present disclosure. In an embodiment of the present disclosure, the bit width of each Ynode in the data structure is adjustable and is of a fixed value when the maximum number of sub-locations of Ynodes is determined.

Specifically, the information of the second intersections includes the X coordinate, a Y coordinate, sub-location information, and Fill Information of the second intersection. The information of the second intersection is compared with the Ynodes of the first Ynode information table, and accordingly Ynodes on the first Ynode information table are updated or an Ynode is added to the first Ynode information table. When the Y coordinate of the second intersection is not the same as any Y coordinate of the Ynodes, that means the second intersection is newly generated; then, according to the Y coordinate of the second intersection and the order the Ynodes are stored in the first Ynode information table, an Ynode is added to a corresponding position in the first Ynode information table, which stores the information of the second intersection; at the same time, the number of Ynodes of the first Ynode information table as reflected in the Ynode content table is also updated, that is, the number is added by 1. When the Y coordinate of the second intersection is the same as one of the Y coordinates in the Ynodes, it indicates that the position in the second intersection has been crossed by a vector line before, and then an Ynode corresponding to the Y coordinate is updated according to the information of the second intersection. In one embodiment, the vector graphics processing device is a Graphics Processing Unit (GPU) that is capable of tessellation. In one embodiment, the GPU is an nVIDIA GPU with a Fermi architecture, an nVIDIA GPU with a Kepler architecture, an nVIDIA GPU with a Maxwell architecture, an AMD GPU with an Evergreen architecture, an AMD GPU with a GCN architecture, or the like.

As shown in FIG. 3, the tessellation data processing system applied in vector graphics processing devices includes a construction module 31, an Xnode processing module 32, and a Ynode processing module 33.

The construction module 31 constructs a data structure in memory; the data structure comprises an Xnode content table and a plurality of Xnode information tables or the data structure comprises a Ynode content table and a plurality of Ynode information tables, wherein each row of the Xnode content table stores an address in the memory and a number of Xnodes of an Xnode information table corresponding to a horizontal line, and each Xnode information table stores Xnodes of an information table corresponding to a row of the Xnode content table; each row of the Ynode content table stores an address in the memory and a number of Ynodes of an information table corresponding to a vertical line, and each Ynode information table stores Ynodes of an information table corresponding to a row of the Ynode content table.

The Xnode processing module 32 is connected to the construction module 31. When the data structure comprises the Xnode content table and the plurality of Xnode information tables, and a vector line generated by tessellation intersects a horizontal line to obtain a first intersection, the Xnode processing module reads from the Xnode content table an address and number of Xnodes of a first Xnode information table, wherein the first Xnode information table corresponds to a first row of the Xnode content table corresponding to the Y coordinate of the first intersection, and according to the address and number of Xnodes of the first Xnode information table, the Xnode processing module locates the Xnodes of the first Xnode information table in the memory and reads the Xnodes of the first Xnode information table from the memory, and the Xnode processing module compares information of the first intersection with the Xnodes of the first Xnode information table, and updates the Xnodes on the first Xnode information table or adds an Xnode to the first Xnode information table;

The Ynode processing module 33 is connected to the construction module 31. When the data structure comprises the Ynode content table and the plurality of Ynode information tables, and a vector line generated by tessellation intersects Y row to obtain an second intersection, the Y note processing module 33 reads from the Ynode content table an address and number of Ynodes of a first Ynode information table, wherein the first Ynode information table corresponds to a first row of the Y content table corresponding to the X coordinate of the second intersection, according to the address and number of Ynodes of the first Ynode information table, the Y note processing module locates and reads Ynode information contained in the first Ynode information table from the memory, and the Ynode processing module compares information of the second intersection with the Ynode information contained in the first Ynode information table, and updates or adds Ynodes on the first Y information table.

The structure and principle of the construction module 31, Xnode processing module 32 and Ynode processing module 33 correspond to the steps in the tessellation data processing method applied in vector graphics processing devices.

It needs to be noted that it should be understood that the division of modules of the above device is only a logical function division, and the modules can be fully or partially integrated into a physical entity or physically separated in the actual implementation. In one embodiment, these modules can all be implemented in the form of software called by processing components. In one embodiment, they can also be all implemented in the form of hardware. In one embodiment, some of the modules can also be realized in the form of software called by processing components, and some of the module can be realized in the form of hardware. For example, a certain module may be separated by processing components, or it may be integrated into a chip of the device, or it may be stored in the memory of the device in the form of programs, and the function of the module may be performed by one or several processing components of the device. The implementation of other modules is similar. In addition, all or part of these modules can be integrated together, or can be implemented separately. The processing component may be an integrated circuit with the capability of of signal processing. In one implementation, each step or each module of the above method can be implemented by hardware integrated circuits or software instructions in the processing component.

For example, the above modules can be one or more integrated circuits configured to implement the above methods, such as: one or more Application Specific Integrated circuits (ASICs), or one or more Digital signal processors (DSPs), or one or more Field Programmable Gate Arrays (FPGAs). For another example, when one of the above modules is implemented in the form of processing component calling software, the processing component can be a generic processor, such as a Central Processing Unit (CPU), or another processor that can call programs. Alternatively, these modules can be integrated together and implemented as a System-on-a-chip (SoC).

The present disclosure also provides a storage medium on which a computer program is stored; when the computer program is executed by a processor, the tessellation data processing method applied in vector graphics processing devices mentioned above is realized. The memory may be a ROM, RAM, magnetic disk, flash drive, memory card, optical disk, or other media that can store program codes.

As shown in FIG. 4, in one embodiment, a vector graphics processing device of the present disclosure comprises a processor 41 and memory 42.

The memory 42 stores computer programs;

The memory 42 includes one or more of a ROM, RAM, magnetic disk, flash drive, memory card, optical disk, or other media that can store program codes.

The processor 41 is connected to the memory 42, and is used to execute the computer programs stored in the memory to drive the vector graphics processing device to perform the tessellation data processing method applied in vector graphics processing devices mentioned above.

Preferably, the processor 41 can be a general processor, including a Central Processing Unit (CPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

In summary, the tessellation data processing method, system, medium and vector graphics processing device of the present disclosure adopt a sorting algorithm based on X or Y coordinates, and requires Fill Information of only effective intersections generated by tessellation, and there is no need to save Fill Information of all pixels of the whole vector graph, which effectively reduces memory footprint; also vector graphics can be filled directly according to the saved information of intersections in order to avoid spending extra time on searching for intersections, effectively reducing the system bandwidth and improving vector graphics rendering performance. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A tessellation data processing method applied in a vector graphics processing device, comprising:
   constructing a data structure in memory, wherein the data structure comprises an Xnode content table and a plurality of Xnode information tables or the data structure comprises a Ynode content table and a plurality of Ynode information tables, wherein the vector graphics processing device comprises a Graphics Processing Unit capable of tessellation data processing,
   wherein each row of the Xnode content table stores an address in the memory and a number of Xnodes of an Xnode information table corresponding to a horizontal line, and each Xnode information table comprises Xnodes of an information table corresponding to a horizontal line, and
   wherein each row of the Ynode content table stores an address in the memory and a number of Ynodes of a Ynode information table corresponding to a vertical line, and each Ynode information table comprises Ynodes of an information table corresponding to a vertical line;
   when the data structure comprises the Xnode content table and the plurality of Xnode information tables, and a vector line generated by tessellation intersects a horizontal line to obtain a first intersection, from the Xnode content table, reading an address and number of Xnodes of a first Xnode information table, wherein the first Xnode information table corresponds to a first row of the Xnode content table corresponding to the Y coordinate of the first intersection, and according to the address and number of Xnodes of the first Xnode information table, locating the Xnodes of the first Xnode information table in the memory and reading the Xnodes of the first Xnode information table from the memory; comparing information of the first intersection with the Xnodes of the first Xnode information table, and updating the Xnodes of the first Xnode information table, or adding an Xnode to the first Xnode information table; and
   when the data structure comprises the Ynode content table and the plurality of Ynode information tables, and a vector line generated by tessellation intersects a vertical line to obtain an second intersection, from the Ynode content table, reading an address and number of Ynodes of a first Ynode information table, wherein the first Ynode information table corresponds to a row of the Y content table corresponding to the X coordinate of the second intersection; according to the address and number of Ynodes of the first Ynode information table, locating the Ynodes of the first Ynode information table in the memory and reading the Ynodes of the first Ynode information table from the memory; and comparing information of the second intersection with the Ynodes of the first Ynode information table, and updating the Ynodes of the first Ynode information table, or adding a Ynode to the first Ynode information table.

2. The tessellation data processing method applied in the vector graphics processing device according to claim 1,
   wherein the Xnodes of the first Xnode information table comprises X coordinates, Fill Information, numbers of sub-locations, and sub-location information of intersections,
   wherein the Ynodes of the first Xnode information comprises Y coordinates, Fill Information, numbers of sub-locations, and sub-location information of intersections,
   wherein the information of the first intersection includes an X coordinate, the Y coordinate, sub-location information, and Fill Information of the first intersection, and
   wherein the information of the second intersections includes the X coordinate, a Y coordinate, sub-location information, and Fill Information of the second intersection.

3. The tessellation data processing method applied in the vector graphics processing device according to claim 2, wherein the number of sub-locations is adjustable and is not a fixed value, as long as information of all sub-locations of each intersection can be recorded.

4. The tessellation data processing method applied in the vector graphics processing device according to claim 1, wherein:
when the data structure comprises the Xnode content table and the plurality of Xnode information tables, and the X coordinate of the first intersection is not equal to any X coordinate included in the Xnodes of the first Xnode information table, an Xnode is added to a corresponding position in the first Xnode information table, and the number of Xnodes of the first Xnode information table as reflected in the Xnode content table is updated at the same time,
when the data structure comprises the Ynode content table and the plurality of Ynode information tables, and the Y coordinate of the second intersection is not equal to any Y coordinate included in the Ynodes of the first Ynode information table, a Ynode is added to a corresponding position in the first Ynode information table, and the number of Ynodes of the first Ynode information table as reflected in the Ynode content table is updated at the same time.

5. The tessellation data processing method applied in the vector graphics processing device according to claim 1, wherein:
when the data structure includes the Xnode content table and the plurality of Xnode information tables, and the X coordinate of the first intersection is the same as one of the X coordinates included in the Xnodes of the first Xnode information table, an Xnode of the first Xnode information table corresponding to the X coordinate is updated, and
when the data structure includes the Ynode content table and the plurality of Ynode information tables, and the Y coordinate of the second intersection is the same as one of the Y coordinates included in the Ynodes of the first Ynode information table, a Ynode corresponding to the Y coordinate is updated.

6. The tessellation data processing method applied in the vector graphics processing device according to claim 1,
wherein Xnodes of the Xnode information tables are sorted according to corresponding X coordinates of the Xnodes, and Ynodes of the Ynode information tables are sorted according to corresponding Y coordinates of the Ynodes.

7. The tessellation data processing method applied in the vector graphics processing device according to claim 1,
wherein the bit width of each Xnode in the data structure is adjustable and is of a fixed value when the maximum number of sub-locations in Xnodes is determined; the bit width of each Ynode in the data structure is adjustable and is of a fixed value when the maximum number of sub-locations in Ynodes is determined.

8. A storage medium on which a computer program is stored, wherein when the computer program is executed by a processor, the tessellation data processing method applied in vector graphics processing devices according to claim 1.

9. A vector graphics processing device, comprising a processor and memory, wherein
the memory stores computer programs,
the processor executes the computer programs stored in the memory to cause the vector graphics processing device to perform the tessellation data processing method applied in vector graphics processing devices according to claim 1.

10. A tessellation data processing system applied in a vector graphics processing device, comprising a construction module, an Xnode processing module and a Ynode processing module, wherein the vector graphics processing device comprises a Graphics Processing Unit capable of tessellation data processing,
wherein the construction module constructs a data structure in memory, the data structure comprises an Xnode content table and a plurality of Xnode information tables or the data structure comprises a Ynode content table and a plurality of Ynode information tables, wherein each row of the Xnode content table stores an address in the memory and a number of Xnodes of an Xnode information table corresponding to a horizontal line, and each Xnode information table comprises Xnodes of an information table corresponding to a horizontal line, wherein each row of the Ynode content table stores an address in the memory and a number of Ynodes of a Ynode information table corresponding to a vertical line, and each Y node information table comprises Ynodes of an information table corresponding to a vertical line,
wherein when the data structure comprises the Xnode content table and the plurality of Xnode information tables, and a vector line generated by tessellation intersects a horizontal line to obtain a first intersection, the Xnode processing module reads from the Xnode content table an address and number of Xnodes of a first Xnode information table, wherein the first Xnode information table corresponds to a first row of the Xnode content table corresponding to the Y coordinate of the first intersection, and according to the address and number of Xnodes of the first Xnode information table, the Xnode processing module locates the Xnodes of the first Xnode information table in the memory and reads the Xnodes of the first Xnode information table from the memory, the Xnode processing module compares information of the first intersection with the Xnodes of the first Xnode information table, and updates the Xnodes of the first Xnode information table or adds an Xnode to the first Xnode information table,
wherein when the data structure comprises the Ynode content table and the plurality of Ynode information tables, and a vector line generated by tessellation intersects a vertical line to obtain an second intersection, the Y note processing module reads from the Ynode content table an address and number of Ynodes of a first Ynode information table, wherein the first Ynode information table corresponds to a row of the Y content table corresponding to the X coordinate of the second intersection, according to the address and number of Ynodes of the first Ynode information table, the Y note processing module locates the Ynodes of the first Ynode information table in the memory and reads the Ynodes of the first Ynode information table from the memory, and the Ynode processing module compares information of the second intersection with the Ynodes of the first Ynode information table, and updates Ynodes on the first Y information table or adds a Ynode to the first Y information table.

* * * * *